United States Patent [19]
DuBose et al.

[11] Patent Number: 4,584,540
[45] Date of Patent: Apr. 22, 1986

[54] DIGITAL DIRECT MODULATOR WITH TYPE OF MODULATION SELECTION

[75] Inventors: J. Timothy DuBose, Dallas; David L. Hale, Garland; Robert K. Marston, Plano, all of

[73] Assignee: Rockwell International Corporation, El Segundo, Calif.

[21] Appl. No.: 736,060

[22] Filed: May 20, 1985

[51] Int. Cl.⁴ .......................... H03C 3/00; H03K 7/00
[52] U.S. Cl. .................................. 332/9 R; 332/16 R; 332/23 R; 375/44
[58] Field of Search .................... 332/9 R, 16 R, 23 R, 332/23 A; 375/44, 45, 46, 47, 52, 55, 62, 64, 65, 66, 67; 455/102

[56] References Cited

U.S. PATENT DOCUMENTS

| | | | |
|---|---|---|---|
| 3,787,785 | 1/1974 | Bass | 375/67 X |
| 3,958,191 | 5/1976 | Jones, Jr. | 332/9 R X |
| 3,987,374 | 10/1976 | Jones, Jr. | 375/62 X |
| 4,404,532 | 9/1983 | Weltz | 332/23 R X |
| 4,442,530 | 4/1984 | Parish, Jr. et al. | 332/9 R X |
| 4,504,802 | 3/1985 | Heatherington | 375/67 X |

Primary Examiner—Eugene R. LaRoche
Assistant Examiner—D. C. Mis
Attorney, Agent, or Firm—Bruce C. Lutz; V. L. Sewell; H. Fredrick Hamann

[57] ABSTRACT

The present invention uses digital values of MSK-like waveshapes which can be stored in a storage media such as a ROM and then output in a prescribed fashion such as in phase quadrature through the use of an addressing technique to the ROM. The digital values, each of N bits, are then multiplied in quadrature times a data representative signal which is divided into phase quadrature components. These N+1 bit products are summed to produce a composite digital signal representing analog bipolar values. A digital-to-analog conversion provides the modulated analog output signal.

9 Claims, 4 Drawing Figures

DIGITAL DIRECT MODULATOR WITH TYPE OF MODULATION SELECTION

FIELD OF THE INVENTION

The present invention is generally concerned with electronics and more specifically with digital electronics. Even more specifically, the present invention is concerned with the modulation of one signal by another wherein the entire modulation process is accomplished with digital signals and it is not converted to an analog signal until after the mixing of phase quadrature amplitude weighted components and summation.

BACKGROUND ART

Traditional methods of digital modulation of carrier signals for data communications rely on analog techniques which require specific design development efforts for each new application. (Different center frequency, baud rates, etc.). These prior art approaches require even more design effort when it is desired that the modulating waveforms need to be varied from that previously used.

SUMMARY OF THE INVENTION

The present invention stores the digital values of the multiplying waveform in memory such as a PROM (programmable read only memory). If the PROM has enough capacity, multiple waveforms can be stored and selectively addressed so that a single basic circuit with only minor specific modifications can be used for various types of shift keyed digital data modulations such as MSK (minimum shift keyed), CMSK, SMSK, FSK (frequency shift keyed), PSK (phase shift keyed), BPSK (binary phase shift keyed), etc. Since the design is digital, the RF center frequency can be varied between wide limits without undue concern about passband capabilities of the various components.

It is thus an object of the present invention to provide an improved modulating circuit through the use of digital circuit techniques.

Other objects and advantages of the present invention will be apparent from a reading of the specification and appended claims in conjunction with the drawings wherein:

DESCRIPTION OF THE PREFERRED EMBODIMENTS

Figure 1:
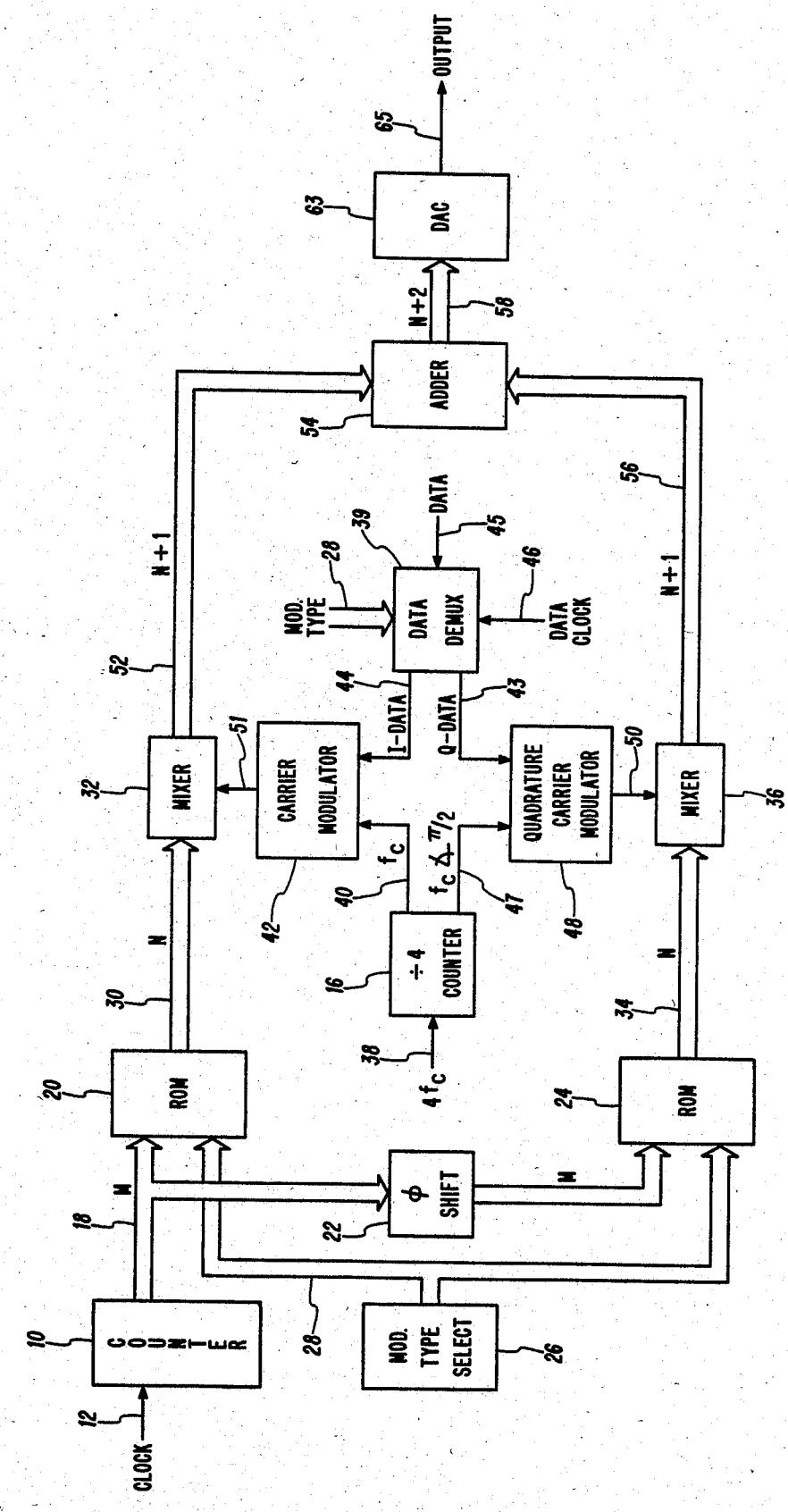
FIG. 1 is a block diagram of an embodiment of the inventive concept.

In FIG. 1 a counter 10 receives a clock input on a lead 12. The counter 10 provides an output on a plurality of leads 18 to a ROM or other readable memory 20 as well as to a 90 degree phase shift block 22. The counter output corresponds to discrete phase output increments. The block 22 inverts the most significant bit of the plurality of M leads 18 and accomplishes this phase shift function. The plurality of leads is then output from block 22 to a further ROM 24. A modulation type select block 26 supplies signals on a plurality of leads 28 to each of the ROMs 20 and 24 as well as to a data demux or data demultiplexer 39 to be later described. The ROM 20 provides N bits of output corresponding to an amplitude weighted signal on a set of leads 30 to a multiplier or mixing circuit 32. The ROM 24 supplies N bits of output signal on a similar set of leads 34 to a mixer or multiplying circuit 36.

Figure 2A:
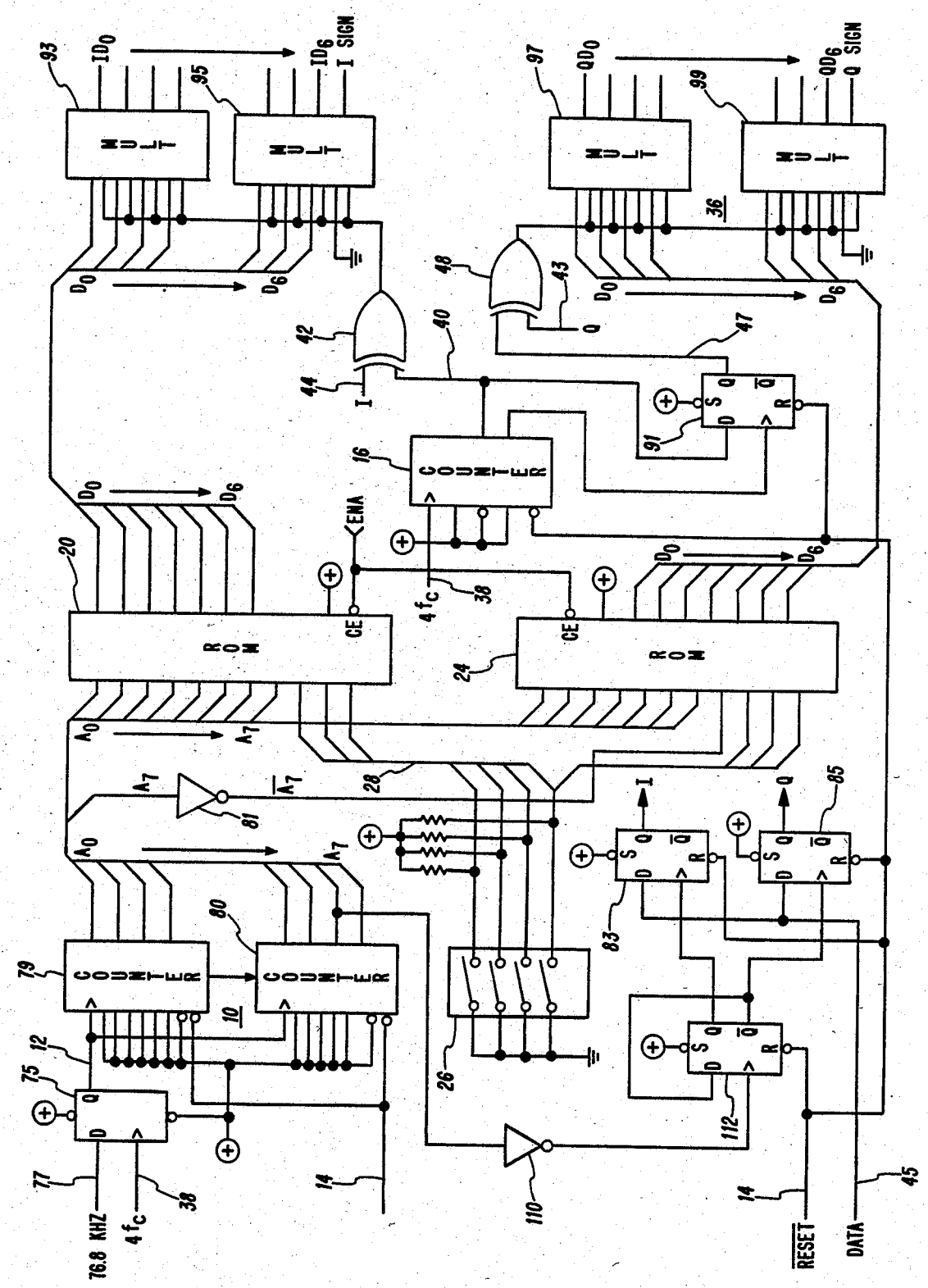
FIGS. 2A and 2B are a detailed diagram of one embodiment of the inventive concept shown in FIG. 1.

A high frequency input clock $4f_c$ is supplied on a lead 38 to counter 16. The counter 16 provides a divide by four function whereby a lower frequency $f_c$ clock is generated on lead 40 and a phase shifted version having a 90 degree relative phase with respect to the signal on lead 40 is generated on lead 47. Lead 40 is connected to a carrier modulator block 42 which receives an in-phase or I phase data signal on lead 44 from data demultiplexer 39. Data is input to the data demultiplexer 39 on a lead 45. Data demultiplexer 39 receives a data input clock on lead 46. The demultiplexer 39 (shown in FIG. 2A is an embodiment of MSK-like modulation) provides Q data or quadrature phase data on an output lead 43 which is supplied to the quadrature carrier modulator 48. Modulator 42 provides output signals on lead 51 to mixer 32 comprising a modulated combination of the $f_c$ and I data inputs. The quadrature carrier modulator 48, similar to 42, supplies signals on a lead 50 to the mixer 36, similar to 32. While input leads are provided on lead 30 to mixer 32, it requires N+1 leads to handle the numbers generated by the multiplying operation. A similar situation occurs with respect to mixer 36. The set of leads 52 is supplied to adder 54 which also receives N+1 signal input leads designated as 56 from mixer 36. In general, N+2 leads are output on lead 58 from adder 54 to a digital-to-analog converter 63 which provides an analog output on lead 65. However, proper scaling of the digital number output signals from ROMs 20 and 24 can limit the DAC input 58 to a value which can be accommodated with N+1 leads.

It should be noted that the multiplier means 32 and 36 multiply either by an analog value of 1 or −1 which is equivalent to digital values of 1 or 0. As shown, the data is input to the two multipliers on a single lead (i.e., 50 or 51).

Figure 2B:
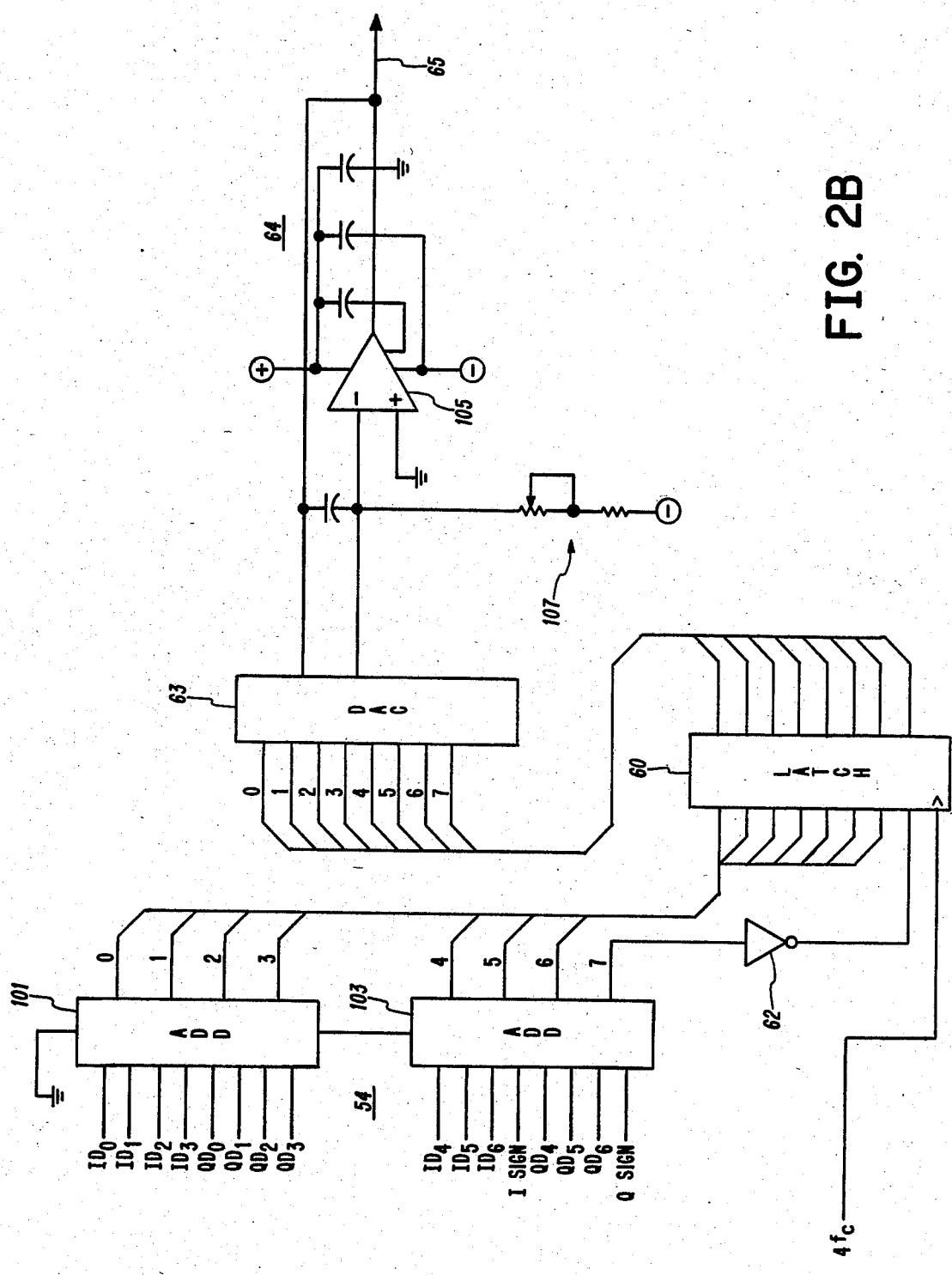

Although not shown in FIG. 1 since it is not necessary for practicing the invention, one embodiment of the invention used a reset (or output enable) lead to both the counters 10 and 16 to synchronize or slave the modulator to a master timing source for phase coherency.

Where applicable, the designators of FIG. 1 will be reused in FIGS. 2A and 2B, which is a specific embodiment of FIG. 1 with M=8 and N=7 and an MSK data rate of 600 bits per second. A D flip-flop 75 is shown with a clock such as clock 38 of FIG. 1 and a lower frequency clock 77 for setting a clock rate of $2^M$ times the baud rate on the lead 12. The counter generally designated as 10 is shown specifically as two LS161 counter chips 79 and 80. Eight output leads designated as A0 through A7 are supplied to an EPROM (erasable PROM) 20 which may be of any type but one used in the invention was a 2716 made by Intel. The 90 degree phase shifter 22 is accomplished by the inverter designated as 81. Only the most significant or eighth addressing bit (A7) is inverted. The other seven bits are applied to the EPROM 24 in the same manner as they are applied to the EPROM designated as 20. The modulation type select block 26 is shown schematically in FIG. 2A as a set of switches which can be selectively actuated. The data demultiplexer 39 shown in FIG. 1 is represented by 110, 112, 83 and 85 in FIG. 2A. Data is supplied on lead 45 to a pair of D flip-flops 83 and 85 to generate in-phase 44 and quad-phase data components 43 from the data signal 45, depending on the type of modulation. The counter 16 may be a single LS161 chip similar to the two chips used for counter 10. The output of this counter is logically combined with the in and quad-phase data signals in a pair of exclusive OR gates 42 and 48 (these function as the similarly numbered modulator blocks of FIG. 1). The D flip-flop 91 accomplishes the phase shift function for the carrier $f_c$ provided by the $\div 4$ counter 16 of FIG. 1. The outputs of the two exclusive OR gates 42 and 48 are supplied to a set of LS86's which are microcircuit chips each containing a plurality of exclusive OR gates. The blocks 93 and 95 accomplish the result of multiplying block 32 in FIG. 1 while exclusive OR gates 97 and 99 accomplish the function of the multiplying block 36. As may be noted, only seven amplitude representative data bits are supplied from the memory chips 20 and 24 to the multiplying circuits to minimize the required hardware. The multiplication generates an additional sign bit, or significant bit, thus, there are eight data bits output by each of the multipliers 32 and 36.

FIG. 2B shows an adder generally designated as 54 comprising individual LS283 adder chips 101 and 103. The eight bits output by the adder circuit 54 are all supplied to the latch 60 which may be an LS374 with the most significant bit inverted by inverter 62. The DAC 63 of FIG. 1 comprises 60, 62, 63, 105 and 107 of FIG. 2B. The conversion from digital-to-analog signals 63 may be accomplished by a chip designated generally as AD 7533 and an operational amplifier 105 and associated passive components to change the differential current output of the converter 63 to a voltage signal. A set of resistors generally designated as 107 establishes the midpoint range of the converter output 63 as zero volts DC.

Although digital-to-analog converters can be purchased from many sources, the chip used in the present invention was purchased from Analog Devices. All the remaining LS chips recited during the above discussion may be purchased again from many sources such as from Texas Instruments. In each case, the type designation of the chip used supra is a standard used in the industry.

OPERATION

The heart of the present invention is the use of an addressable storage device such as ROMs 20 and 24 which are used to store attributes of the modulating signal or modulation symbol shape wherein the values defining this shape can be addressed and retrieved a value at a time, mixed with or multiplied by the data signal in mixers 32 and 36 and, after summation of the signals, converted to an analog value. The modulation symbols stored in the read only memories 20 and 24, in this embodiment, are half-wave or, in other words, define only 180 electrical degrees of a waveshape. Other phase lengths stored in ROM (such as $2\pi$, or $\pi/2$ radians) could be used in other embodiments.

Minimum shift keying has been described in various publications over the years. One example is in a Bruene, et al., patent application No. 367,705, filed Apr. 12, 1982, and assigned to the same assignee as the present invention. As is well known, the generalized MSK equation is set forth in Equation 1 below:

$$y(t) = \pm \cos \omega_o t \cos \beta_c \pm \sin \omega_o t \sin \beta_s \quad o < t < T_c \qquad (1)$$

where $\omega_o$ = carrier frequency in radians $$\beta_C = \frac{\pi t}{2T_c} g_2(t)$$

$$\beta_S = \frac{\pi t}{2T_c} g_1(t)$$

For MSK; $g_2(t) = g_1(t) = 1$

As will be noted above, the terms comprising cos $\beta_c$ and sin $\beta_s$, are constant frequency values since the $g_1(t)$ and $g_2(t)$ terms are equal to 1. By manipulation of trigonometric identity functions, it may be ascertained that for FSK the equation can be simplified to that shown in Equation 7:

$$y(t) = \cos \omega_o t \cos \beta_c \pm \sin \omega_o t \sin \beta_s = \cos (\omega_o t \mp \beta_c) \qquad (7)$$

where $$\beta_C = \beta_S = \frac{\pi t}{T_c} \qquad (8)$$

It should be noted that, in MSK class waveforms such as SMSK and CMSK, $g_1(t)$ always equals $g_2(t)$. For implementing FSK, the clock signal 12 must increase in frequency by 2 to maintain the same data rate and data must be sent to the I channel only. Q channel data input 43 to modulator 48 should be grounded.

Although the basic circuit will have minor alterations such as applying a logic 1 to 43 for various types of shift keyed signals, these may be readily ascertained by those skilled in the art using the trigonometric identities to ascertain which signals are required in what form for each of the various types of modulation.

With waveforms of the generalized MSK type, the counter 10 is clocked at a rate $2^M$ times the data bit rate. In the implementation shown in FIG. 1, the PROMs 20 and 24 each contain several sets of waveforms and thus, a modulation select block 26 is used to select a specific set of those waveforms. The counter output 18 corresponds to discrete phase increments of value $\pi/2^M$ radians for a total range of $\pi$ radians in this specific embodiment. The 90 degree phase shifter 22 causes the addresses to be altered such that the amplitude values output by the ROMs upon being addressed are in a sine/cosine relationship. Thus, the amplitude digital values being sent from ROM 20 to multiplier 32 describe a positive half sine (or other waveshape appropriate to the modulation described) wave over a period of one/half cycle from zero amplitude at zero degrees rising to a maximum or "1" value at 90 degrees and returning to zero amplitude at 180 degrees. Delayed by a bit period, the output from ROM 24 will similarly start from a zero amplitude at zero electrical degrees, maximum at 90 electrical degrees and return again to zero amplitude at the 180 degree point. The clock signal on lead 38 being applied to counter 16 is typically much higher than the clock 12 since $f_c$ is the carrier frequency but must be leading edge synchronized with same if a special circuit such as 75 and shown in FIG. 2A is not used to achieve the equivalent of synchronization.

The counter 16 reduces the frequency of the clock 38 by a factor of four and outputs quadrature carrier signals on leads 40 and 47. The data 45 is demultiplexed into I-data and Q-data, with I-data supplied on lead 44 to modulator 42 and the Q-data phase shifted 90 degrees and output on lead 43 to modulator 48. The quadrature data is combined with the quadrature carrier frequency signals from the counter 16 in modulators 42 and 48 and applied to the two mixers 32 and 36.

If, as mentioned previously, the circuit is being used to provide frequency shift keyed modulation, a signal on modulation type input 28 stops the output of signals on lead 43 so that the carrier frequency is applied to both mixers but the data signal is only supplied to mixer 32.

The signals being applied to the two mixers in combination with the N bits input from ROMs 20 and 24 requires that N+1 bits of data must be output by the two mixers. The adder 54 adds these two digital signals to produce a sum signal output on the set of leads 58. Digital-to-analog converter 63 receives the summation signal and converts it to an analog signal. The analog signal is converted from current to voltage by operational amplifier 105 and output from the device.

To summarize, each of the ROMs 20 and 24, provide a set of digital values which represent a modulating waveform and for all but QPSK signals these two sets of signals, as output, must have a 90 degree offset. Further, the two sets of values are 180 electrical degrees of the waveform and are cyclically repeated. These sets of values are multiplied times the data values in mixers 32 and 36 to produce two outputs having one additional sign bit. The adder 54 takes the two sets of values and produces a composite signal which is a bipolar representation of the waveform output which, in general, can have potentially one additional bit for addition overflow. This can be alleviated if the waveform magnitude stored in ROM is suitably scaled to a value to prevent overflow. By inverting the most significant bit with inverter 62, the digital-to-analog converter 63 receives a magnitude only number which is converted to an analog output which for MSK is a nominally constant amplitude signal with a shift in phase as each data bit occurs which is different in logic value from the previous data bit.

The specific implementation of the present invention used 1's complement circuitry and 1's complement numeric manipulation algorithms for hardware minimization. Since this does provide a slight error in the symmetry of the output signal, it may be desirable for some applications to use 2's complement circuitry to perform the numerical computations, 2's complement arithmetic giving an exact result in discrete form.

Figure 3:
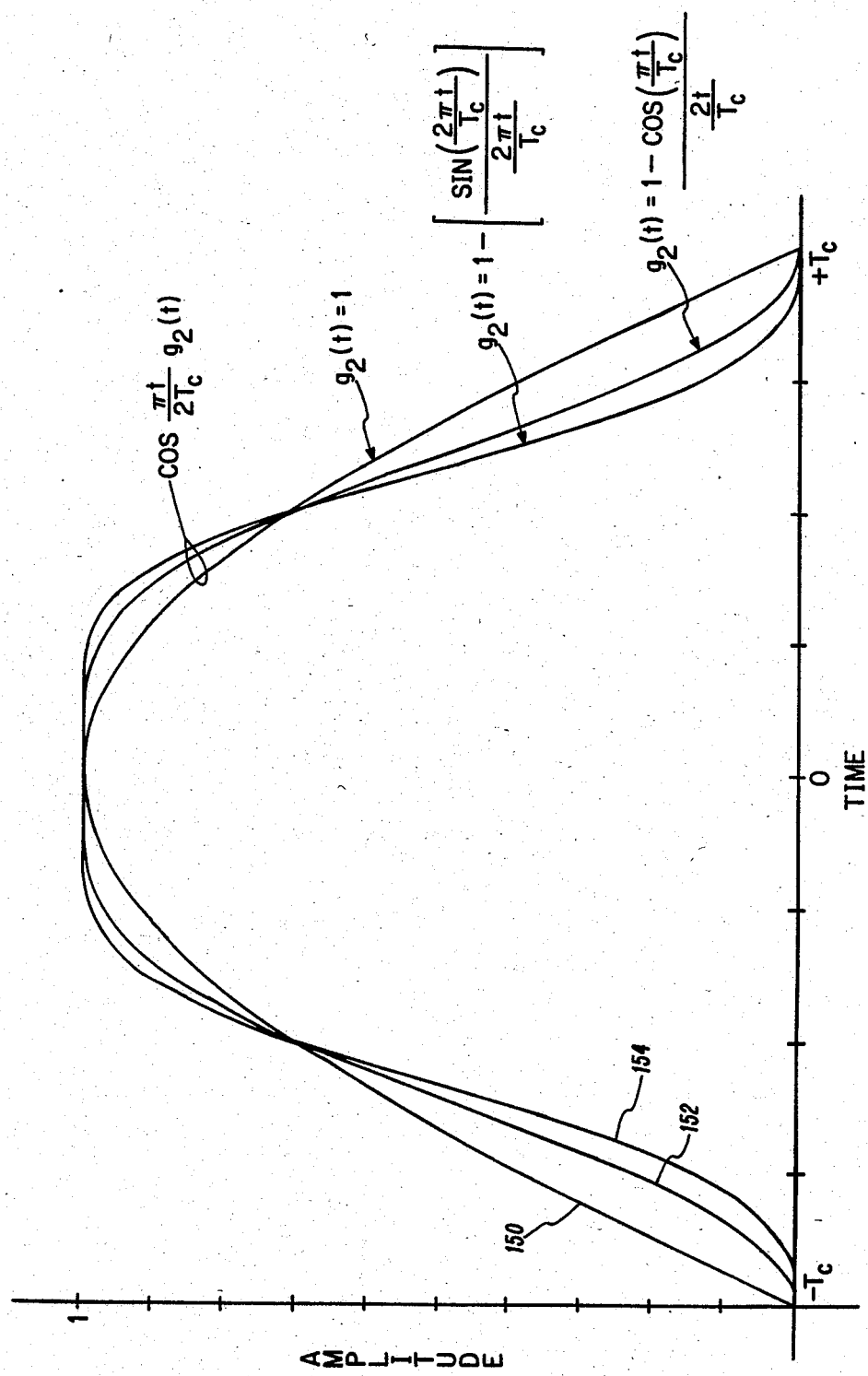
FIG. 3 is a set of waveforms illustrating the amplitude weighting of modified MSK signaling for different parameters of the function $g_2(t)$.

As illustrated in FIG. 3, three waveforms are shown as used in various forms of shift keyed operation. The term $$\cos \frac{\pi t}{2T_C} g_2(t)$$

may be easily recognized as that found in the generalized MSK Equation 1. The differences in waveforms lies in the $g_2$ or $g_1$ term. By using the modified waveforms, better performance can be obtained. The values for these curves may easily be ascertained and inserted in the ROMs 20 and 24 to obtain the appropriate outputs. As illustrated, waveform 150 is that used for MSK, waveform 152 is that used for CMSK or cosine minimum shift keying and waveform 154 is that used for SMSK or sinusoidal minimum shift keying.

A single ROM could be used with multiplexed addressing if the ROM is large enough and if such an approach provides less components.

The version illustrated in FIG. 1 is a multi-use modulator for many types of modulation and if it is desired that only a given type of modulation be performed, the modulation type select block 26 can be omitted and smaller capacity ROMs or other addressable memory devices may be utilized.

As illustrated in FIGS. 2A and 2B, the multiplying function of blocks 32 and 36 is performed by exclusive OR gates, the 90 degree phase shift of block 22 is performed by the inverter 81 on the most significant bit of the addressing output and the 90 degree phase shifting of the signal on lead 47 is performed by D flip-flop 91.

It is believed that with the description above, further comments on the detailed implementation shown for the two embodiments of the invention is unnecessary.

Other modifications will be apparent to those skilled in the art and we wish to be limited not by the specific implementation illustrated but only by the scope of the appended claims wherein we claim:

1. Digital modulator apparatus comprising, in combination:
   addressing signal first means for providing a repeating sequentially generated first set of digital address signals ranging from an equivalent of 0 to 180 electrical degrees;
   addressable memory second means, including address input means connected to said first means for receiving said set of digital address signals therefrom, said second means providing an N bit digital output having a shaped first set of numerical values;
   addressable memory third means, including address input means and digital value output means for providing an N bit digital output having a shaped second set of numerical values;
   logic fourth means, connecting said first means to said input means of said third means, for inverting the most significant bit of the address signals whereby the digital output of said third means is shifted in phase by 90 degrees with respect to the output from said second means;
   exclusive OR gate multiplying fifth means including a plurality N of first and second exclusive OR inputs and a set N+1 of outputs for providing a first product signal;
   exclusive OR gate multiplying sixth means including a plurality N of first and second exclusive OR inputs and a set N+1 of outputs for providing a second product signal;
   means connecting the digital outputs of said second and third means to the first exclusive OR inputs of each of said fifth and sixth means as multiplicand signals;
   high frequency clock signal seventh means for supplying a serially generated second set of digital address signals;
   data eighth means for providing in phase and quadrature phase data signals;
   signal combining ninth means, including output means, connected to said seventh and eighth means for combining said clock signal and said in phase data signal in a manner such that the logic value of the data signal affects the logic value of the clock signal to generate a multiplier output ninth signal at said output means thereof;

signal combining tenth means, including output means, connected to said seventh and eighth means for combining said clock signal and said quadrature phase data signal in a manner such that the logic value of the data signal affects the logic value of the clock signal to generate a multiplier output tenth signal at said output means thereof;

eleventh means, connecting said ninth means to said fifth means, for applying said ninth signal to said second exclusive OR input of said multiplying fifth means;

twelfth means, connecting said tenth means to said sixth means, for applying said tenth signal to said second exclusive OR input of said multiplying sixth means;

adding twelfth means, connected to said outputs of said fifth and sixth means for receiving said first and second product signals therefrom, said twelfth means including output means for providing a summation output twelfth signal indicative of the sum of the signals input thereto and comprising a sign bit and at least N data bits representing amplitude of a signal to be output; and digital-to-analog converter thirteenth means, including input means connected to said output means of said twelfth means for receiving summation signals therefrom and including output means, for converting the digital input signals to an analog representation of the data as modulated by the data stored in said addressable memory second and third means.

2. The method of digitally modulating a digital signal in accordance with a predetermined algorithm comprising the steps of:

serially addressing a plurality of digital values defining 180 electrical degrees of a modulating signal to provide in-phase and quadrature-phase digital output first and second signals respectively each comprising N bits;

exclusive ORing an in-phase digital representation of a digital data signal with said first signal to provide a digital output third signal comprising N+1 bits;

exclusive ORing a quadrature-phase digital representation of said digital data signal with said second signal to provide a digital output fourth signal comprising N+1 bits;

adding said third and fourth signals to provide a digital summation fifth signal comprising N+2 bits; and converting said digital sixth signal to an analog output signal representative of the modulation of said digital data by said modulating signal.

3. Apparatus for digitally modulating a digital signal in accordance with a predetermined algorithm comprising, in combination:

read-only memory first and second means, each of said first and second means including output means and addressable memory locations storing a plurality of digital amplitude values defining 180 electrical degrees of a modulating signal, the output of said second means having a 90 degree phase shift relative to the output of the first means;

third means, connected to said first and second means, for addressing said plurality of addressable memory locations to provide digital output first and second signals each comprising N bits;

fourth means for providing output in-phase and quadrature-phase data signals;

fifth means for providing in-phase and quadrature-phase carrier signals;

exclusive ORing sixth means, including output means and having input means connected to said fourth and fifth means and to said output means of said first means, for providing a digital output 360 electrical degree sixth signal comprising N+1 bits;

exclusive ORing seventh means, including output means and having input means connected to said fourth and fifth means and to said output means of said second means, for providing a digital output 360 electrical degree seventh signal comprising N+1 bits;

adding eighth means, including output means and input means connected to said output means of said sixth and said seventh means, for adding said sixth and seventh signals to provide a digital summation eighth signal comprising at least N+1 bits; and converting ninth means, including output means and input means connected to said output means of said eighth means, for converting said digital eighth signal to an analog output signal representative of the modulation of said digital data by said modulating signal.

4. Apparatus as claimed in claim 3 for providing an FSK signal wherein:

said data signal supplied by said fifth means is not utilized by said seventh means.

5. Apparatus for digitally generating modulated signals comprising, in combination:

first and second digital signal storage means each including signal output means, said first and second storage means providing respective first and second signal values phase quadrature related and comprising N bits;

data signal supplying third means, including output means, for supplying in-phase third and quadrature-phase fourth signals which third and fourth signals represent data by changing from in-phase to opposite phase for logic 1 and logic 0 conditions;

multiplying fourth means, including output means and input means connected to said output means of said first and third means, for receiving said first and third signals and generating a product fifth signal of N+1 bits;

multiplying fifth means, including output means and input means connected to said output means of said second and third means, for receiving said second and fourth signals and generating a product sixth signal of N+1 bits;

adding sixth means, including output means and input means connected to said fourth and fifth means, for summing said fifth and sixth signals to produce a bipolar digital sum seventh signal of at least N+1 bits having predetermined positive and negative maximum values; and conversion seventh means, including input means connected to said sixth means, for converting said digital seventh signal to an analog output signal.

6. The method of generating a high accuracy analog signal using digital signals for modulation and mixing comprising the steps of:

generating in-phase and quadrature-phase digital multiplier signals of N bits each from at least one set of stored digital amplitude values defining a predetermined waveform;

generating in-phase and quadrature-phase logic 1 or logic 0 multiplicand signals representing data to be used in the modulated output;

separately multiplying said in-phase and quadrature-phase multiplier and multiplicand signals to generate first and second product signals of N+1 bits;

adding said first and second product signals to provide a bipolar sum signal of at least N+1 bits; and converting said sum signal to an analog output signal representative of the digital values of said sum signal.

7. The method as claimed in claim 6 wherein the converting step includes inverting the sign bit of said sum signal to produce a monopolar digital signal prior to the digital-to-analog conversion.

8. Apparatus for generating a high accuracy analog signal using digital signals for modulation and mixing comprising, in combination:

first means for generating in-phase and quadrature-phase digital multiplier signals of N bits each from at least one set of stored digital amplitude values defining a predetermined waveform;

second means for supplying in-phase and quadrature-phase multiplicand single bit carrier signals at least one of which multiplicand signals is data signal modulated;

separately multiplying said in-phase and quadrature-phase multiplier and multiplicand signals to generate first and second product signals of N+1 bits;

adding said first and second product signals to provide a digital sum signal of N+2 bits; and converting said sum signal to an analog output signal representative of the digital values of said sum signal.

9. Apparatus for digitally modulating a digital signal in accordance with a predetermined algorithm comprising, in combination:

read-only memory first and second means, each of said first and second means including output means and addressable memory locations storing a plurality of digital amplitude values defining at least 90 electrical degrees of a modulating signal, the output of said second means having a 90 degree phase shift relative the output of the first means;

third means, connected to said first and second means, for addressing said plurality of addressable memory locations to provide digital output first and second signals each comprising N bits;

fourth means for providing output in-phase and quadrature-phase data signals;

fifth means for providing in-phase and quadrature-phase carrier signals;

exclusive ORing sixth means, including output means and having input means connected to said fourth and fifth means and to said output means of said first means, for providing a digital output 360 electrical degree sixth signal comprising N+1 bits;

exclusive ORing seventh means, including output means and having input means connected to said fourth and fifth means and to said output means of said second means, for providing a digital output 360 electrical degree seventh signal comprising N+1 bits; and signal combining and converting eighth means, connected to said sixth and said seventh means for combining said sixth and seventh signals and converting the combination to an analog output eighth signal.

* * * * *